Figure 1:
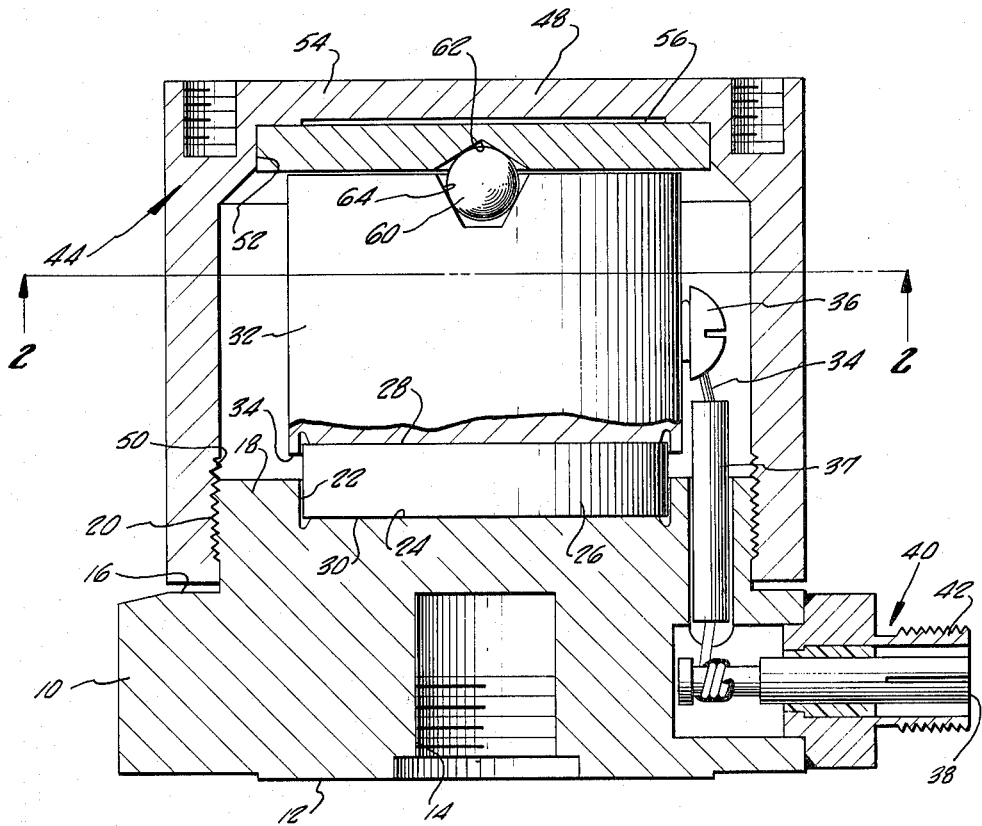

Feb. 8, 1966     B. R. TOLLIVER ETAL     3,233,465

ACCELEROMETER

Filed July 16, 1962

INVENTORS.
BILLY R. TOLLIVER
JAMES H. GRADIN
BY
Christie, Parker & Hale
ATTORNEYS.

United States Patent Office 3,233,465
Patented Feb. 8, 1966

3,233,465
ACCELEROMETER
Billy R. Tolliver, Monrovia, and James H. Gradin, Whittier, Calif., assignors to Consolidated Electrodynamics Corporation, Pasadena, Calif., a corporation of California
Filed July 16, 1962, Ser. No. 210,102
2 Claims. (Cl. 73—517)

This invention relates to accelerometers and, more particularly, is concerned with a device for measuring high acceleration forces acting along a predetermined axis.

Accelerometers have heretofore been proposed utilizing a piezoelectric crystal, one face of which is secured to a mounting frame and the other face of which is in contact with a spring loaded mass. Any acceleration force applied to the frame of the accelerometer along the axis of movement of the mass results in the force exerted on the crystal being increased or decreased depending upon the direction of acceleration. The change in force on the crystal produces a signal which is a measure of the acceleration force involved.

In using such an accelerometer in measuring accelerations encountered in vibrations occurring in aircraft, missiles, and the like, the mass must be constrained to apply force only along one measuring axis in relation to the crystal. The inertial mass must be mounted along this axis in such a way as to provided uniform loading across the surface of the crystal and in such a way as to make the device insensitive to cross axis forces. Moreover, the inertial mass must be isolated from high energy sound vibrations which are frequently encountered in vibration measurements. In order that the accelerometer may measure the acceleration forces produced on a physical structure by the presence of sound waves for instance, the accelerometer must not react directly to those sound waves but only react to the vibrations produced by the sound waves on the structure being tested.

Heretofore, various arrangements have been provided for mounting and spring loading the inertial mass against the piezoelectric crystal. Such known mounting methods, however, have not been sufficiently rigid to substantially eliminate across axis sensitivity. Other accelerometer designs have been difficult to construct and assemble and have not provided uniformly reproducible accuracies from unit to unit. Also, the prior or designs frequently have not given adequate isolation of the inertial mass from acoustical waves.

The present invention provides an improved accelerometer design which is more rugged yet easier to assemble and which provides a high degree of reproducibility. The accelerometer of the present invention exhibits very low sensitivity to cross axis forces.

To this end, the accelerometer of the present invention is provided with a completely enclosed rigid housing having a chamber with opposing end walls. The housing is adapted to be securely mounted on the part being tested. The piezoelectric crystal or crystals are sandwiched between one end wall of the chamber and a block of metal which serves as the inertial mass. The block frictionally engages the crystal and is held against the crystal by a compliant disc adjacent the opposite wall of the chamber. A spacer, preferably in the form of a ball, positioned between the center of the disc and the block, loads the block by deflection of the disc center.

The completely enclosed housing isolates the inertial mass from external influence, such as sound waves. The spacer is arranged to have substantially point contact with the block. The effect of cross axis forces is thereby minimized and any deformation of the housing does not affect the accuracy of the accelerometer.

Figure 2:
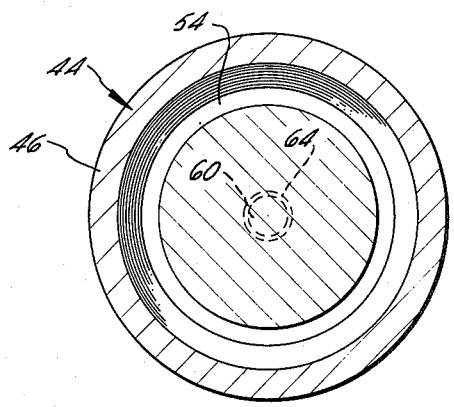

For a more complete understanding of the invention, reference should be made to the accompanying drawings, wherein:

FIGURE 1 is a longitudinal sectional view of the accelerometer; and
FIGURE 2 is a sectional view taken substantially on the line 2—2 of FIGURE 1.

Referring to the drawing in detail, the numeral 10 indicates generally a base member of the accelerometer having a bottom surface 12 which is adapted to be clamped in rigid contact with the structure whose acceleration is being measured. The accelerometer is designed to measure acceleration forces acting perpendicular to the surface 12 of the base 10. In order to mount the accelerometer, the base 10 is provided with a threaded opening 14 by which the accelerometer can be threaded to a stud (not shown) or otherwise screwed to the structure being tested.

The base 10 is provided with an external thread 20 extending around the upper portion 18 thereof. The upper portion is recessed at 22 to form a flat surface 24 against which is seated a piezoelectric crystal 26 in the form of a flat circular disc. The crystal 26 is made of any suitable piezoelectric material, such as barium titanate, lead titanate, or quartz.

The upper surface of the crystal 26 engages a flat surface 28 on the bottom side of an inertial mass indicated generally at 32. The inertial mass 32, which is preferably cylindrical in shape, is made of any suitable dense nonmagnetic metal having relatively hard surfaces. The inertial element 32 acts as one electrode in contact with the crystal 26 while the base 10 acts as the other electrode. An electrical connection is made by a lead 34 secured to the inertial element 32 by a screw 36. A conductor 34 preferably extends through an insulating sleeve 37 to the center connector 38 of a coaxial connector indicated generally at 40. The outer concentric conductor 42 of the connector 40 is soldered or otherwise secured to the base to provide an electrical connection through the conductive material of the base to the surface 24 of the crystal 26.

The crystal 26 and inertial mass 32 are completely enclosed by the base 10 and an enclosure structure indicated generally at 44 which is in the form of a substantially cylindrical cup-shaped member having a relatively heavy cylindrical side wall 46 and an integral end wall 48. The lower end of the side wall 46 is provided with an internal thread 50 which engages the thread 20 on the base. The inner surface of the end wall 48 is counterbored as indicated at 52 and a heavy metallic diaphragm 54 of spring material is press-fitted into the recess formed by the counterbore. The press-fit prevents any movement of the margin of the diaphragm disc under the extreme vibration forces encountered in operation. The inner surface of the end wall 48 is recessed as indicated at 56 so that the central portion of the diaphragm 54 is free to be deflected.

A spacer member 60 in the form of a sapphire ball engages a recess in the center of the diaphragm 54, the recess providing a conical surface 62 against which the ball 60 is seated. The ball 60 also engages the inertial mass 32, the ball preferably wedging in a slightly tapered recess 64 located along the central axis of the accelerometer.

When assembled, the enclosure member 44 is screwed down on the threaded portion of the base 20 until the diaphragm is deflected sufficiently to place the crystal 26 under substantial compression. The sapphire ball 60 provides electrical insulation between the inertial mass 32 and the rest of the structure.

In the construction of the accelerometer as described above, the inertial mass 32 and crystal 26 are completely enclosed by the base 10 and enclosure 44, thus isolating the mass from acoustical waves. The sapphire ball 60 provides contact with the inertial mass 32 closely adjacent the central axis thereof, providing substantially uniform distribution of loading across the surface 28 of the crystal 26. The preloading of the diaphragm 54 holds the inertial mass 32 and crystal 26 against any lateral movement. Rotation of the enclosure 44 in applying a preloading condition to the diaphragm 54 cannot produce any unbalance of loading across the surface of the crystal 26 since the load is transferred to the ball 60 substantially along the axis of revolution of the enclosure 44. The side walls 46 and the end wall 48 of the enclosure 44 as well as threads 20 and 50 are made sufficiently strong so that substantially all of the deflection under even the greatest acceleration forces is absorbed by deflection of the diaphragm 54 alone. The diaphragm 54 is so stiff that only the displacement of a few microinches takes place at the inner face between the inertial member 32 and the crystal 26 under acceleration forces of thirty-five to forty times gravity. Any lateral forces which squeeze or distort the enclosure 44, while they may change the amount of preloading on the crystal, do not change the sensitivity of the accelerometer to forces along the central axis, since the force transmitted between the ball 60 and the intertial mass 32 can only be in a direction normal to the surface formed by the bottom of the recess 64.

While a single crystal has been shown and described, it is well-known that multiple crystals as well as other transducer means may be employed. In such event, it may not be necessary to electrically isolate the inertial mass, in which case a metallic contact member may be employed in place of the sapphire ball.

What is claimed is:

1. An accelerometer for detecting vibration forces acting along one axis of a body, comprising a base adapted to be rigidly secured to said body, the base having a flat surface transverse to said axis, a piezoelectric crystal engaging said flat surface, an inertial member having a flat surface at one end engaging the opposite surfaces of the crystal, a rigid enclosure member having a solid non-compliant cylindrical side wall and an end wall, the end of the side wall remote from the end wall being threaded for threadably securing the enclosure member to the base and completely enclosing the crystal and the inertial member, the end wall of the enclosure having a counterbore, a compliant diaphragm press fitted into the counterbore to be in radial contact with the end wall around the periphery of the diaphragm, the diaphragm having a depression in the center of the surface opposite the other end of the inertial member, a ball positioned in the depression and engaging said other end surface of the inertial member to have substantially point contact with the inertial member along the axis of revolution of the threaded portion of the enclosure member so that it can be threaded on the base until the ball is pressed against the inertial member by the diaphragm, the diaphragm being normally deflected in the center so as to exert a force on the crystal through the ball and said member, the force being increased or decreased by acceleration forces exerted by the inertial member along said axis, and electrical means connected to the crystal for sensing changes in the electrical characteristics of the crystal with changes in the forces exerted on the crystal by acceleration of the inertial member.

2. Accelerometer in accordance with claim 1 wherein the ball is a sapphire ball.

References Cited by the Examiner

UNITED STATES PATENTS

| 2,411,401 | 11/1946 | Welch | 73—517 |
|---|---|---|---|
| 2,435,031 | 1/1948 | Burns | 73—71.4 |
| 2,682,003 | 6/1954 | Stubner | 310—8.4 |
| 3,075,099 | 1/1963 | Shoor | 310—8.4 |

FOREIGN PATENTS 409,790  3/1945  Italy.

RICHARD C. QUEISSER, Primary Examiner.

ROBERT L. EVANS, JAMES J. GILL, Examiners.

UNITED STATES PATENT OFFICE
CERTIFICATE OF CORRECTION

February 8, 1966

Patent No. 3,233,465

Billy R. Tolliver et al.

It is hereby certified that error appears in the above numbered patent requiring correction and that the said Letters Patent should read as corrected below.

Column 1, line 28, for "provided" read -- provide --; line 43, for "across" read -- cross --; same column 1, line 46, for "or" read -- art --; column 3, line 38, for "surfaces" read -- surface --.

Signed and sealed this 24th day of January 1967.

(SEAL)
Attest:

ERNEST W. SWIDER
Attesting Officer

EDWARD J. BRENNER
Commissioner of Patents